No. 655,353. Patented Aug. 7, 1900.
C. O. F. SCHROTTKE.
METER.
(Application filed Dec. 27, 1897.)
(No Model.)
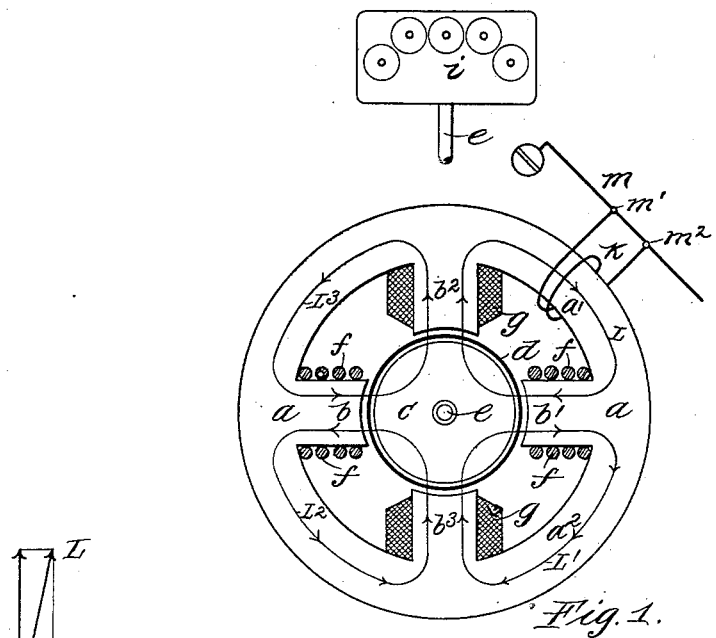
Fig. 1.
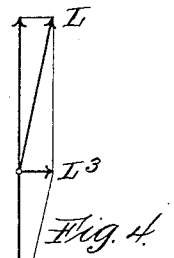
Fig. 4.
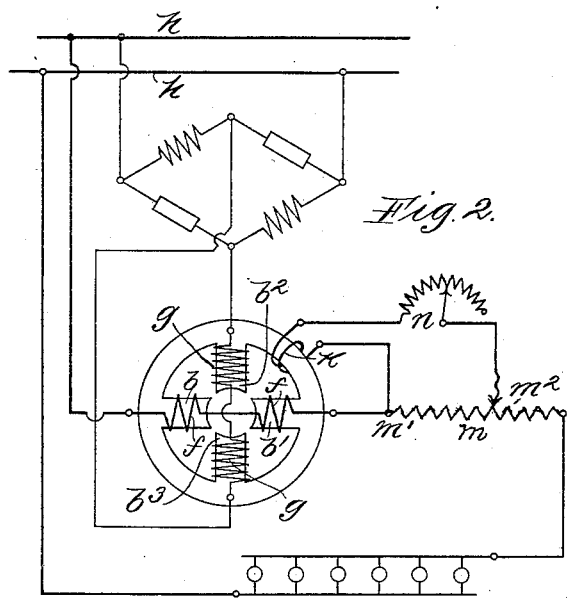
Fig. 2.
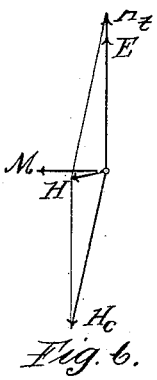
Fig. 6.
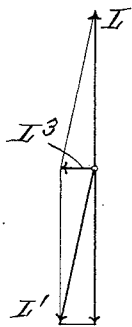
Fig. 5
Fig. 3.
Witnesses:
A. N. C. Danner
George L. Cragg
Inventor;
Carl O. F. Schrottke
By Barton & Brown
Attorneys.
THE NORRIS PETERS CO., PHOTO-LITHO., WASHINGTON, D. C.

UNITED STATES PATENT OFFICE.

CARL OTTO FRANZ SCHROTTKE, OF BERLIN, GERMANY, ASSIGNOR TO THE SIEMENS & HALSKE ELECTRIC COMPANY OF AMERICA, OF CHICAGO, ILLINOIS.

METER.

SPECIFICATION forming part of Letters Patent No. 655,353, dated August 7, 1900.

Application filed December 27, 1897. Serial No. 663,613. (No model.)

*To all whom it may concern:*

Be it known that I, CARL OTTO FRANZ SCHROTTKE, a subject of the Emperor of Germany, residing at Berlin, Germany, have invented new and useful Improvements in Meters, (Case No. 135,) of which the following is a specification, reference being had to the accompanying drawings, forming a part of this specification.

My invention relates to single or multiphase alternating-current meters in which the meter-train is actuated by an alternating-current motor. As is well known, a certain retarding or braking force is exerted upon the rotating element of the motor, due to the friction in the journals and pivots of the rotating element of the motor and the meter-train. It is necessary in order that accurate measurement may be had of the consumed current that this friction be overcome. To this end a torque is provided which is equal to the frictional force, so that the meter is set into action when any translating device is cut into circuit. The energy consumed in the working circuit, even though it is very small in amount, may be accurately measured by a meter in which this initial torque is provided.

The invention herein has for its object the construction of an improved form of meter wherein means are provided for producing a torque for counteracting the friction, an adjustment being also preferably provided whereby the torque may be made equal in force to the friction which may vary in the different meters.

The invention will be more fully explained by reference to the accompanying drawings, which illustrate one form of meter to which the improvement may be applied and the preferred embodiment of the invention as applied to the meter.

Figure 1 is a diagrammatic view of the meter, the motor portion whereof is shown in plan, while the measuring-train is removed therefrom and shown in complete elevation for the sake of clearness. Fig. 2 is a diagram of the motor portion of the meter as actually associated with the distributing and consumption circuits. Fig. 3 is a detailed diagrammatic view of a portion of the meter. Figs. 4, 5, and 6 are diagrams showing the development of resultants from component forces.

Like letters indicate like parts throughout the different views.

The motor herein shown is provided with a stationary magnetic mass $a$, in the form of an annulus, composed of laminæ of magnetic material, such as iron, having four polar projections $b$ $b'$ $b^2$ $b^3$, which radiate toward the center. A second stationary mass $c$, in the form of a cylinder, is disposed concentrically within the annulus, a small space intervening between the cylinder and the encircling poles, in which a copper drum $d$ is rotatably mounted upon a shaft $e$. The poles $b$ $b'$ are wound with coils $f$ $f$, of heavy wire, which constitute the winding that is to be included in series with the translating devices. The poles $b^2$ $b^3$ are wound with helices $g$ $g$, of fine wire, which are included in a bridge of the distributing-mains $h$ $h$, which receive current from a main source of supply. Means are diagrammatically illustrated in Fig. 2 for producing the requisite phase difference in the shunt-coils, and as this forms no part of the present invention further description thereof is not deemed essential. The apparatus, however, is fully described in United States Patent No. 611,902, issued to J. H. F. Görges October 4, 1898.

By a meter as thus constructed and connected in circuit a rotating field is produced, which causes the drum to turn. The field increases in strength in proportion to the increase of current in the heavy wire coils. The drum upon rotating actuates the measuring-train $i$. To overcome the friction in the measuring-train and the journals of the drum or armature-shaft, an initial torque is provided for when circuit through the coils $f$ $f$ is opened, the coils $g$ $g$ only being traversed by current. To this end a few turns $k$ of wire are wound about the annulus between two polar projections, as $b'$ $b^2$. The coil $k$ is closed, the coil being thus a short-circuited coil. The direction in which this initial torque exerts a rotary effort upon the drum depends upon its location upon the annulus. If the short-circuit winding is applied at $a^2$ instead of at $a'$, the direction of the rotary effort will be reversed. This may be accounted for by the following explanation.

Supposing that the short-circuited coil is opened, lines of force L L' L² L³ will be set up in the annulus by the current in coils $g\ g$, the lines of force set up following, for example, the directions indicated by the arrows. The lines of force threading the magnetic circuits L' L², respectively, oppose the lines of force threading the magnetic paths L L³, whereby the effect of the lines of force threading the poles $b\ b'$ is neutralized. Upon closing the short-circuited coil currents will be induced in it, a throttling action thus being exerted upon the lines of force in the magnetic circuit L, the lines of force in the other magnetic circuits remaining unchanged. Consequently the lines of force L will without essential change in their strength undergo a small shifting of phase toward the lines of force L', as illustrated diagrammatically in Fig. 4. By this shifting of the phase a resultant L³ is formed, which has a phase of nearly ninety degrees relative to the lines of force L L'. This resultant should have a turning effect upon the drum sufficient to counteract the friction in the working parts, means being provided, as will be presently set forth, for adjusting the torque to the friction that is to be overcome.

The coil $k$, which has but few turns, is closed by means of a small adjusting-resistance, preferably in the form of a German-silver wire $m$, supported upon a stationary portion of the meter at one end. The coil is connected at one end with the terminal $m'$, the other end of the coil being connected at $m^2$ with the resistance, this point being so located that the choking effect in the short-circuited coil will produce the desired initial torque.

If the short-circuited coil were wound about the annulus at $a^2$ instead of at $a'$, the lines of force L' would become slightly shifted in phase, as shown diagrammatically in Fig. 5, the resultant L³ being shifted about one hundred and eighty degrees from its position it occupies with a short-circuited coil disposed at $a'$. The turning effort upon the drum will now be exerted in the opposite direction. It will be observed that when any translating devices are cut into circuit the current in the series winding with the short-circuit winding would create a torque opposed to the torque created by means of the fine-wire and short-circuited coils, since the location $a'$ has a relative position to the coils $f\ f$ similar to the position of the location $a^2$ relative to the coils $g\ g$. In order, therefore, that the initial torque intended to counteract the friction remain the same under all conditions, means must be provided for preventing the production of a torque by the series and short-circuited coils. To this end the arrangement shown in Fig. 2 may be employed. The resistance $m$, which closes the coil $k$, is included in series with the coils $f$. By a proper adjustment of the amount of resistance $m$ the requisite stability of the torque produced through the agency of the coils $g$ and $k$ is maintained.

I will explain the action by referring to Fig. 6. The magnetomotive force is produced by two components H$^c$ and H$^t$, the former being due to the current in the coils $f f$, while the latter is due to the current in the drum occasioned by the coils. The resultant magnetomotive force H creates the field M. The electromotive force E in the coil $k$ is displaced ninety degrees from this resultant H, while the difference of potential across the resistance M' M is in phase with its current and must therefore be in phase with the component H$^c$. It will thus be seen that the two electromotive forces are nearly opposed to each other, thereby making it possible to overcome the deleterious effects of the main current upon the short-circuited winding. A constant force is exerted upon the drum by a component L³, Fig. 4, thereby tending to rotate the drum. This force is dependent upon the number of windings in and the resistance in series with the coil K. The displacement of one field—L, for instance, Fig. 1—creates a rotating field, the magnitude of the actuating component being dependent upon the amount of displacement.

A second adjustable resistance $n$ is connected between the terminal $m^2$ and the short-circuited coil to adjust the throttling action thereof. The arrangement in Fig. 3 may be employed, in which the resistance-wire $m$ is connected at its terminals $m\ m^2$ in series with the coil $k$, the working conductor being connected at a suitable point $m^3$ to secure the proper results.

But one form of meter is herein shown and described. It is obvious, however, that the invention may be adapted for use with meters of other construction. I therefore do not desire to limit myself to the precise construction or embodiment of the invention herein shown and described nor to the application of the invention to the particular form of meter shown; but,

Having thus described my invention, I claim as new, and desire to secure by Letters Patent, only with the limitations expressed or by law implied in view of the state of the related arts, the following:

1. In an alternating-current meter, the combination with an annulus of magnetic material, of two shunt-coils placed at opposite points of said annulus, a closed coil wound about said annulus nearer to one of the shunt-coils than the other, a series winding, an armature subjected to the action of the fields created by the series and shunt windings, and a measuring-train actuated by the armature, substantially as described.

2. In an apparatus for measuring alternating currents, the combination with an annulus of magnetic material having four polar projections at intervals substantially of ninety degrees, of fine-wire coils disposed upon diametrically-opposite poles, series coils wound about the remaining poles, a rotatably-mounted drum surrounded by the poles, a measuring-train driven by the drum, a closed coil located near one of said shunt-coils, a resistance connecting the terminals of the closed coil, distributing-mains between which the shunt-coils are connected in bridge, and a consumption-circuit in series with the series coils and said resistance or a portion thereof, substantially as described.

3. In an alternating-current meter, the combination with a shunt-winding of fine wire, of a series winding, an armature subjected to the action of the fields created by said windings, a coil in inductive relation with the shunt-winding connected in shunt of resistance in the series circuit, and a resistance in series with the shunt containing the said coil, substantially as described.

4. In an alternating-current meter, the combination with a shunt-winding of fine wire, of a series winding, an armature subjected to the action of the fields created by said windings, a coil in inductive relation with the shunt-winding for producing a starting torque, and an adjusting-resistance in a closed local circuit with the said coil, substantially as described.

5. In an alternating-current meter, the combination with a shunt-winding of fine wire, of a series winding, an armature subjected to the action of the fields created by said windings, a coil in inductive relation with the shunt-winding, and an adjusting-resistance in closed circuit with the said coil, said resistance being partially included in the series circuit, substantially as described.

6. In an alternating-current meter, the combination with two shunt-coils of fine wire, each coil being adapted to create a field, of a series winding, an armature subjected to the action of the fields created by the series and shunt windings, a coil located in the field produced by windings of the meter, and an adjusting-resistance in circuit with said coil, said resistance being partially included in the series circuit, substantially as described.

7. In an alternating-current meter, the combination with two shunt-coils, of a series winding, a coil including adjusting-resistance for throttling or retarding lines of force in one of said fields connected in shunt of resistance in series with the series winding, and an armature subjected to the action of the field created by the series and shunt windings, substantially as described.

8. In an alternating-current meter, the combination with an annulus of magnetic material, of two shunt-windings placed at opposite points of said annulus, a series winding, a coil wound about said annulus nearer to one of the shunt-coils than the other and connected in bridge of resistance in series with the series winding, an adjusting-resistance in series with the said coil, and an armature subjected to the action of the fields created by the series and shunt windings, substantially as described.

9. In an apparatus for measuring alternating currents, the combination with an annulus of magnetic material having four polar projections at intervals substantially of ninety degrees, of fine-wire coils disposed upon diametrically-opposite poles, series coils wound about the remaining poles, a rotatably-mounted drum surrounded by the poles, a winding located near one of said shunt-coils and connected in bridge of resistance in series with the series winding, a resistance in series with the winding located near one of the shunt-coils, distributing-mains between which the shunt-coils are connected in bridge, and a consumption-circuit in series with the series coils, substantially as described.

10. In an alternating-current meter, the combination with a shunt-winding of fine wire creating lines of force following distinct paths, of a series winding, an armature subjected to the action of the fields created by said windings, a coil included in a closed local circuit in inductive relation with the said shunt-winding and surrounding the lines of force following one of said paths for producing a starting torque, the said coil being so disposed with relation to the instrument as to throttle lines of force set up by the shunt-winding, substantially as described.

11. In an alternating-current meter, the combination with a shunt-winding of fine wire, of a series winding, an armature subjected to the action of the fields created by said windings, a coil included in a closed local circuit in inductive relation with the said shunted winding for producing a starting torque, the said coil being so disposed with relation to the instrument as to throttle lines of force, and an adjusting-resistance in the same local circuit with said torque-coil, substantially as described.

12. In an alternating-current meter, the combination with a shunt-winding of fine wire creating lines of force following distinct paths, of a series winding, an armature subjected to the action of the fields created by said windings, a coil in inductive relation with the shunt-winding and surrounding the lines of force following one of said paths for producing a starting torque, substantially as described.

In testimony whereof I affix my signature in the presence of two witnesses.

CARL OTTO FRANZ SCHROTTKE.

Witnesses:
 CHARLES H. DAY,
 PAUL ROEDIGER.